United States Patent
Chaudhari et al.

(10) Patent No.: US 8,425,641 B2
(45) Date of Patent: Apr. 23, 2013

(54) INLET AIR FILTRATION SYSTEM

(75) Inventors: Sudhir Ramesh Chaudhari, Karnataka (IN); Jitendra Harish Bijlani, Karnataka (IN); Carlos Serafim Fernandes, Taunton, MA (US); Rahul Jaikaran Chillar, Marietta, GA (US); Stephen David Hiner, Salisbury (GB)

(73) Assignee: General Electric Company, Schenectady, NY (US)

( * ) Notice: Subject to any disclaimer, the term of this patent is extended or adjusted under 35 U.S.C. 154(b) by 350 days.

(21) Appl. No.: 12/826,727

(22) Filed: Jun. 30, 2010

(65) Prior Publication Data

US 2012/0000168 A1    Jan. 5, 2012

(51) Int. Cl.
*B01D 45/14*    (2006.01)
(52) U.S. Cl.
USPC .......... 55/319; 55/346; 55/396; 55/457
(58) Field of Classification Search .......... 55/319, 55/392, 394, 396, 399, DIG. 14, DIG. 17
See application file for complete search history.

(56) References Cited

U.S. PATENT DOCUMENTS

| | | | | |
|---|---|---|---|---|
| 2,193,883 A * | 3/1940 | Reeves | | 55/337 |
| 2,540,695 A * | 2/1951 | Smith et al. | | 55/332 |
| 3,884,660 A * | 5/1975 | Perry et al. | | 55/396 |
| 3,915,679 A * | 10/1975 | Roach et al. | | 55/347 |
| 4,158,449 A * | 6/1979 | Sun et al. | | 244/136 |
| 4,238,210 A * | 12/1980 | Regehr et al. | | 55/396 |
| 4,289,611 A | 9/1981 | Brockmann | | |
| 4,971,603 A | 11/1990 | Prinsloo et al. | | |
| 4,976,748 A * | 12/1990 | Prinsloo et al. | | 95/269 |
| 5,403,367 A * | 4/1995 | De Villiers et al. | | 55/320 |
| 5,480,464 A * | 1/1996 | De Villiers et al. | | 55/320 |
| 5,498,273 A * | 3/1996 | Mann | | 55/396 |
| 5,536,288 A | 7/1996 | De Witt et al. | | |
| 5,682,759 A * | 11/1997 | Hays | | 62/402 |
| 6,540,802 B2 * | 4/2003 | Trautmann et al. | | 55/337 |
| 6,540,917 B1 * | 4/2003 | Rachels et al. | | 210/512.1 |
| 7,070,637 B1 * | 7/2006 | Zhang | | 55/347 |
| 7,244,282 B2 * | 7/2007 | Greif et al. | | 55/347 |
| 2008/0271421 A1 * | 11/2008 | Darke et al. | | 55/396 |

* cited by examiner

*Primary Examiner* — Duane Smith
*Assistant Examiner* — Sonji Turner
(74) *Attorney, Agent, or Firm* — Hiscock & Barlclay LLP

(57) ABSTRACT

Embodiments of the present invention provide an inertial filtration system for air-ingesting machines. The inertial filter 100 may comprise a reducer 133 downstream of a vortex generator. The reducer 133 decreases the area that the airstream flows through, which may increase the angular momentum and the centrifugal forces acting on the particles of the ingested airstream. This may increase the cleaning performance and a decrease in the pressure drop across the inertial filter 100. Generally, the inertial filter functions such that flow components of higher density are separated from the rest of the airstream. The higher density flow components are bled out of the inertial filter 100 via an outlet 135. The remaining flow components flow downstream to compressor section 535.

20 Claims, 7 Drawing Sheets

INLET AIR FILTRATION SYSTEM

BACKGROUND OF THE INVENTION

The present invention relates generally to a system for filtering an airstream entering an inlet system; and more particularly to an inertial filtration system integrated with the inlet system of an air-ingesting machine.

Some air-ingesting machines, such as, but not limiting of, a gas turbine, may generally include, in serial flow arrangement: an inlet system for receiving and channeling an airstream; a compressor which compresses that airstream; a combustion system that mixes a fuel with the compressed airstream, ignites the mixture; and a turbine section, which transfers energy from gaseous by-products, of the combustion system, to an output power. Other components of the gas turbine may be used therein.

The power output of a gas turbine is proportional to, and limited by, the mass flowrate of compressed airstream exiting the compressor. The compressor has a limited capacity for handling a volumetric flowrate of the airstream, for a given rotational speed of the compressor. Typically, the airstream contains undesirable particles, which may cause erosion, corrosion, or fouling if ingested by the compressor.

Inlet filtration systems are used to remove some of undesired particles. Some inlet filter systems may be required to filter the airstream flowing at relativity lower velocities. This requires larger system components to accommodate a given volume flow rate. Larger capacity gas turbines may require even larger system components.

Inlet filtration systems add resistance to the airstream entering the compressor. This resistance relates to a pressure drop in the inlet system and may be measured in inches of water column. Gas turbines efficiency and power output are a direct function of this pressure drop. The higher the pressure drop of the inlet system pressure drop, the lower the efficiency and power output of the turbomachine.

For the foregoing reasons, there is a desire for an improved filtration system. The system should incorporate an inertial filtration component configured removing some of the undesirable particles.

BRIEF DESCRIPTION OF THE INVENTION

In an embodiment of the present invention, an apparatus for filtering an airstream entering a machine, the apparatus comprising an inertial filter comprising: a tube configured for directing an airstream into a machine; wherein the tube comprises an inlet located adjacent an upstream end, and an outlet located adjacent a downstream end; a swirler configured for generating a vortex on the airstream entering the tube; wherein the swirler is positioned within the tube and downstream of the inlet; a separation region located downstream of the swirler, wherein the separation region allows components of the airstream to concentrate toward an outer periphery region of the tube, and wherein action of the swirler creates swirl in the airstream which separates particles from the airstream; a central region located downstream of the swirler and near a center portion of the tube, wherein the central region is in fluid communication with the separation region and receives less dense components of the airstream, as the separation region receives the more dense components of the airstream; a reducer configured for increasing angular momentum associated with the airstream, wherein the reducer is integrated with the tube; and an expander configured for recovering a pressure loss, wherein an upstream end of the expander is concentrically integrated with a downstream end of the reducer, such that the outlet is located in an annular region formed between an outer diameter of the upstream end of the expander and an inner diameter of the downstream end of the reducer; wherein as the airstream flows through the tube, particles separate from the airstream and then flow through the separation region and exit the tube via the outlet.

In an alternate embodiment of the present invention, a system for removing particles from an airstream entering a turbomachine, the system comprising: an inlet system configured for channeling an airstream to a compressor section, the inlet system comprising: a weather hood; a transition piece; and an inlet duct; and a plurality of inertial filters configured for separating particles from the airstream, wherein each of the plurality of inertial filters comprise: a tube configured for directing an airstream into a turbomachine; wherein the tube comprises an inlet located adjacent an upstream end, and an outlet located adjacent a downstream end; a swirler configured for generating a vortex on the airstream entering the tube; wherein the swirler is positioned within the tube and downstream of the inlet; a reducer configured for increasing angular momentum associated with the airstream, wherein the reducer is integrated with the tube and is positioned downstream of the swirler adjacent the outlet; and an expander configured for recovering a pressure loss associated the reducer, wherein an upstream end of the expander is concentrically integrated with a downstream end of the reducer, such that the outlet is located in an annular region; wherein as the airstream flows through the swirler and the central portion, denser particles separate from the airstream, and then exit via the outlet.

DETAILED DESCRIPTION OF THE INVENTION

Figure 1:
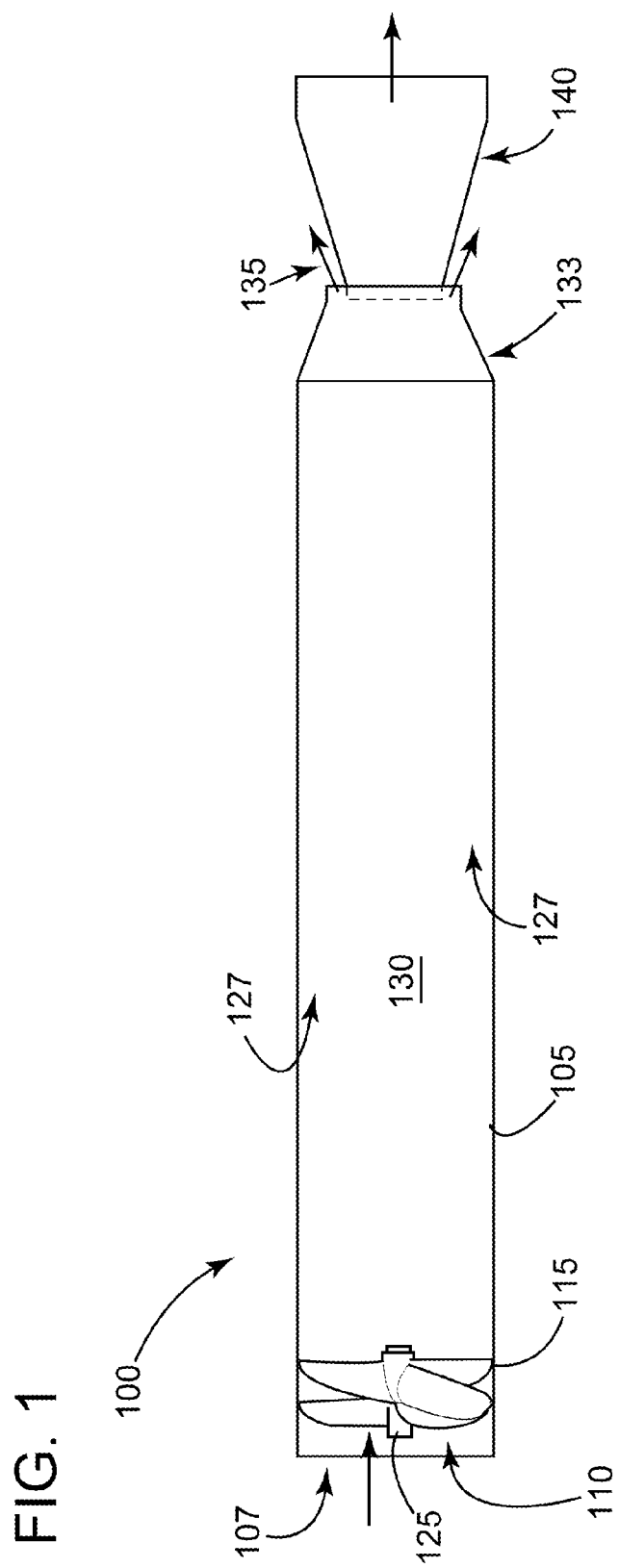
FIG. 1 is a schematic illustrating a side view of an inertial filter, in accordance with an embodiment of the present invention.

The following detailed description of preferred embodiments refers to the accompanying drawings, which illustrate specific embodiments of the invention. Other embodiments having different structures and operations do not depart from the scope of the present invention.

Certain terminology may be used herein for the convenience of the reader only and is not to be taken as a limitation on the scope of the invention. For example, words such as "upper", "lower", "left", "right", "front", "rear", "top", "bottom", "horizontal", "vertical", "upstream", "downstream", "fore", "aft", and the like; merely describe the configuration shown in the Figures. Indeed, the element or elements of an embodiment of the present invention may be oriented in any direction and the terminology, therefore, should be understood as encompassing such variations unless specified otherwise.

Detailed example embodiments are disclosed herein. However, specific structural and functional details disclosed herein are merely representative for purposes of describing example embodiments. Example embodiments may, however, be embodied in many alternate forms, and should not be construed as limited to only the embodiments set forth herein.

Accordingly, while example embodiments are capable of various modifications and alternative forms, embodiments thereof are illustrated by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any, and all, combinations of one or more of the associated listed items.

The terminology used herein is for describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

As discussed herein, embodiments of the present invention are mentioned with reference to air-ingesting turbomachines. However, embodiments of the present invention may apply to a wide variety of machines that ingest an airstream. This may include, but is not limited to, turbomachines, vehicles, aircraft, air-handling machines, or the like.

It should also be noted that in some alternative implementations, the functions/acts noted might occur out of the order noted in the FIGS. Two successive FIGS., for example, may be executed substantially concurrently or may be executed in the reverse order, depending upon the functionality/operations involved.

Referring now to the Figures, where the various numbers represent like elements throughout the several views, FIG. 1 is a schematic illustrating a side view of an inertial filter 100, in accordance with an embodiment of the present invention. An embodiment of the inertial filter 100 may comprise: a tube 105; a swirler 110 comprising a plurality of blades 115 positioned around a rod 125; a separation region 127 and a central region 130 are located downstream of the swirler 110; a reducer 133; an outlet 135; and an expander 140. Other embodiments of the inertial filter 100 may filter the airstream without the use of the rod 125.

As illustrated and described in the FIGS., embodiments of the inertial filter 100 comprise a reducer 133 downstream of a vortex generator. The reducer 133 decreases the area that the airstream flows through, which may increase the angular momentum and the centrifugal forces acting on the particles. This may increase the cleaning performance, and decrease the pressure drop across the inertial filter 100.

Generally, the inertial filter functions such that flow components of higher density are separated from the rest of the airstream. As further described below, the higher density flow components are bled out of the inertial filter 100 via an outlet 135. The remaining flow components flow downstream to compressor section 535.

As used herein an "inertial filter" may be considered a device that initiates a vortex on an airstream flowing therein. Filtration naturally occurs as the centrifugal force associated with the vortex separates the airstream into flow components. This natural separation is based on the relative density of the airstream components. These flow components move longitudinally downstream with the aid of the axial velocity generated by the vortex. Flow components having denser components, which include undesired particles, concentrate toward an outer/larger radius. Flow components having less denser components, flow downstream in a central region.

The tube 105 may comprise a cylindrical shape forming the outer structure of the inertial filter 100. The tube 105 may be configured for directing the airstream into a compressor section 535 (illustrated in FIGS. 5 through 7). As illustrated in FIG. 1, an embodiment of the tube 105 may comprise an inlet 107 located adjacent an upstream end, and an outlet 135 located adjacent a downstream end. The inlet 107 receives and directs the airstream (illustrated as an arrow entering the tube 105) towards the swirler 110. In an embodiment of the present invention, the overall length of the tube 105 may range from about 1 inch to about 18 inches. In an embodiment of the present invention, a diameter of the tube 105 may range from about 0.5 inch to about 2.0 inches. In alternative embodiments of the present invention, the shape of the tube 105 may comprise: an oval, hexagonal, octagonal; or other shape that allows the intended function and use of the tube 105.

The swirler 110 functions to generate a vortex on the airstream entering the inlet 107. This creates a swirling motion in the airstream. The swirler 110 may be positioned adjacent the inlet 107 of the tube 105. In an embodiment of the present invention, the swirler 110 may be stationary. In an alternate embodiment of the present invention, the swirler 110 may rotate while the airstream flows.

As discussed, components of the airstream are subjected to centrifugal forces. Areas downstream of the swirler 110 may include a separation region 127 and a central region 130. Flow components of a relatively higher density, comprising undesired particles, may concentrate adjacent the separation region 127 of the tube 105. The separation region 127 may be considered the outer periphery, or wall, within the tube 105. The separation region 127 generally extends to the outlet 135, where the undesired particles may exit the tube 105. Flow components of a relatively lower density (comprising fewer undesired particles) may flow through the central region 130 of the tube 105. The central region 130 may be considered the center portion of the tube 105 and may be in fluid communication with the separation region 127. The central region 130 integrates with an expander 140; which allows the less dense flow components to exit the tube 105.

Figure 3:
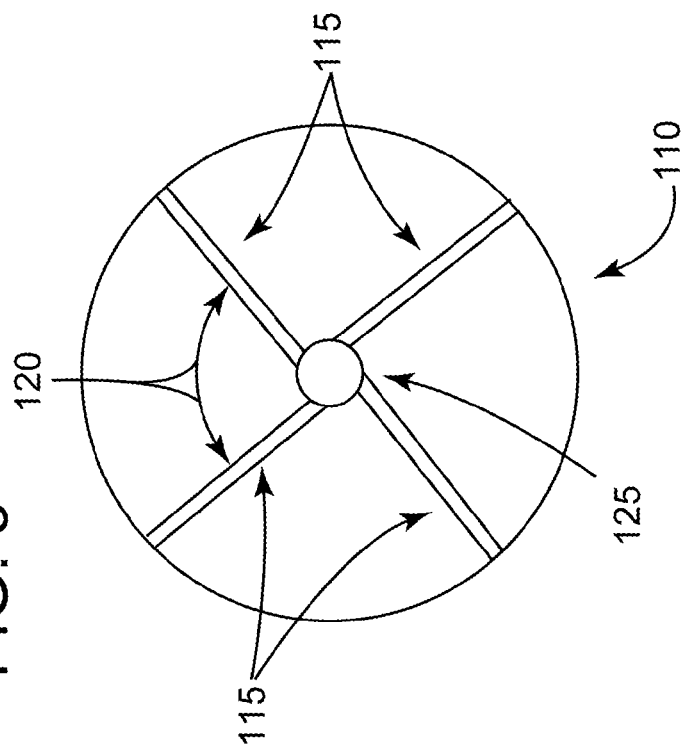
FIG. 3 is a schematic illustrating a top view of the swirler of FIG. 1, in accordance with an alternate embodiment of the present invention.
Figure 2:
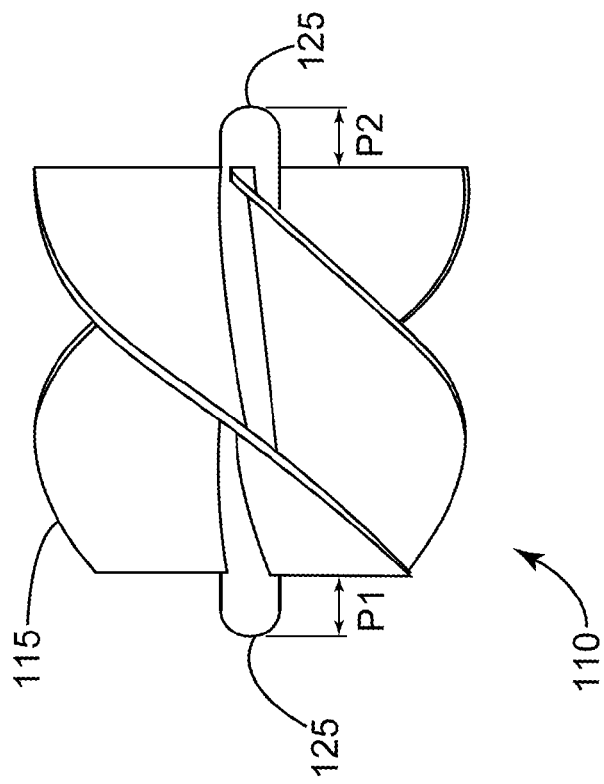
FIG. 2 is a schematic illustrating a side view of the swirler of FIG. 1, in accordance with an embodiment of the present invention.

An embodiment of the swirler 110 may comprise a single blade 115. An alternate embodiment of the swirler 110 comprises a plurality of blades 115. As the airstream flows through the swirler 110 and negotiates the blades 115, the airstream gains angular momentum. This is due to the centrifugal force exerted on the airstream, which may cause the entrained particles to flow into the separation region 127 and then through the outlet 135. The remainder of the airstream may then flow through the expander 140 and towards the compressor section 535, as illustrated and described in FIGS. 5 through 7. As illustrated in FIGS. 2 and 3, the swirler 110 may comprise four twisted blades. An angle 120, as measured between to adjacent blades 115, may be in the range of from about 75 degrees to about 360 degrees. A length of each blade 115 may be in the range of from about 0.5 inch to about 3 inches.

In an embodiment of the present invention, a rod 125 may be connected through an axis of the swirler 110, such as, but not limiting of, a center axis of the swirler 110. The length of the rod 125 may extend beyond each end of the swirler 110, as illustrated in FIG. 2. For example, but not limiting of, the rod 125 may extend from about 0.1 inches to about 0.3 inches beyond each end of the swirler 110, as illustrated by 'P1" and "P2' in FIG. 2.

In an embodiment of the present invention, the upstream and downstream ends of the rod 125 may have a rounded shape. Alternate embodiments of the upstream and/or downstream ends of the rod 125 may shapes other than round. These rounded ends may reduce or minimize wake zones and may reduce the pressure drop across the tube 105. As the airstream flows over the swirler 110 and the rod 125 the aforementioned vortex may be created.

Figure 4:
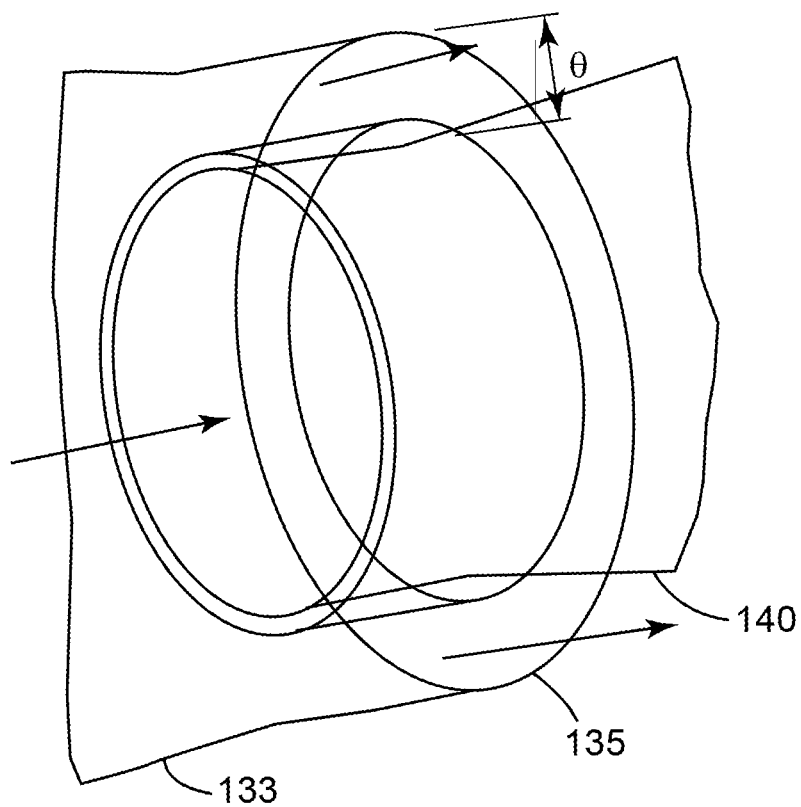
FIG. 4 is a schematic illustrating a side view of a portion of the inertial filter of FIG. 1, in accordance with an embodiment of the present invention.

Referring again to FIG. 1, the reducer 133 may serve to increase the angular momentum associated with the airstream components exiting the tube 105 via the outlet 135 or through the expander 140. The reducer 133 may increase the cleaning efficiency of the tube 105 without increasing the overall pressure drop across the tube 105. As illustrated in FIGS. 1 and 4, an embodiment of the reducer 133 may be located downstream of the swirler 110 and adjacent the outlet 135. An embodiment of the reducer 133 may have the form of, but is not limited to, a decreasing taper; which begins at an upstream portion of the reducer 133 and ends at the outlet 135. Here, a major diameter of the reducer 133 may face upstream and a minor diameter of the reducer 133 may face downstream. In an alternate embodiment of the present invention, the reducer 133 may extended upstream and integrate with and/or subsume the central region 130.

The expander 140 generally serves to recover a pressure loss that derives from the swirling motion associated with the swirler 110. In an embodiment of the present invention, the expander 140 may comprise a tube with a shape, such as, but not limiting of, conical, venture-like, and tubular, etc. The expander 140 may be connected with the downstream end of the tube 105. As illustrated in FIGS. 1 and 4, an upstream end of the expander 140 may be concentrically integrated with a downstream end of the reducer 133. The distance theta ($\theta$) represents an annular region, which forms the outlet 135. This annular region exists between an outer diameter of the upstream end of the expander 140 and an inner diameter of the downstream end of the reducer 133. As illustrated in FIG. 1 the conical shape of the expander 140 may be in the form of a taper. Here, the upstream end of the expander 140 may comprise a minor diameter and the downstream end of the expander 140 may comprise a major diameter. For example, but not limiting of, the taper may comprise an angle of from about 1 degree to about 20 degrees.

Embodiments of the inertial filter 100 may be manufactured out of materials capable of withstanding the operating environment of the airstream. For example, but not limiting of, these materials may include: nylon, plastic, rubber, synthetic rubber, or combinations thereof.

FIGS. 5 through 8 illustrate embodiments of a plurality of inertial filters 100 integrated with an inlet system 500 of a turbomachine. Here, the inertial filters 100 may be positioned in an array, bank, or other configuration that allows adequate coverage of an upstream end of the inlet system 500.

FIGS. 5 through 8 are schematics illustrating environments where an embodiment of the inertial filter 100 may operate. The inlet system 500 may be integrated with a compressor section 535 of an air-ingesting powerplant machine, such as, but not limiting of, a combustion turbine, or the like. FIGS. 5 through 8 illustrate an overview of one configuration of an inlet system 500. Embodiments of the present invention may be integrated with other configurations of the inlet system 500, which are not illustrated in the FIGS. Furthermore, an embodiment of the present invention may be integrated with inlet systems 500, of any machine, and not necessarily associated with combustion turbines, or other turbomachines.

The inlet system 500 channels the airstream (represented by arrows pointed towards the inlet system 500) ingested by the compressor section 535. The airstream may derive directly or indirectly from the ambient environment. Initially, the airstream flows around a weather hood 510, which may prevent weather elements, such as rain, snow, etc, from entering the compressor section 535. Next, the airstream may pass through a transition piece 520 and an inlet duct 525; these components may adjust the velocity and pressure of the airstream. Next, the airstream may flow through a silencer section.

Figure 5:
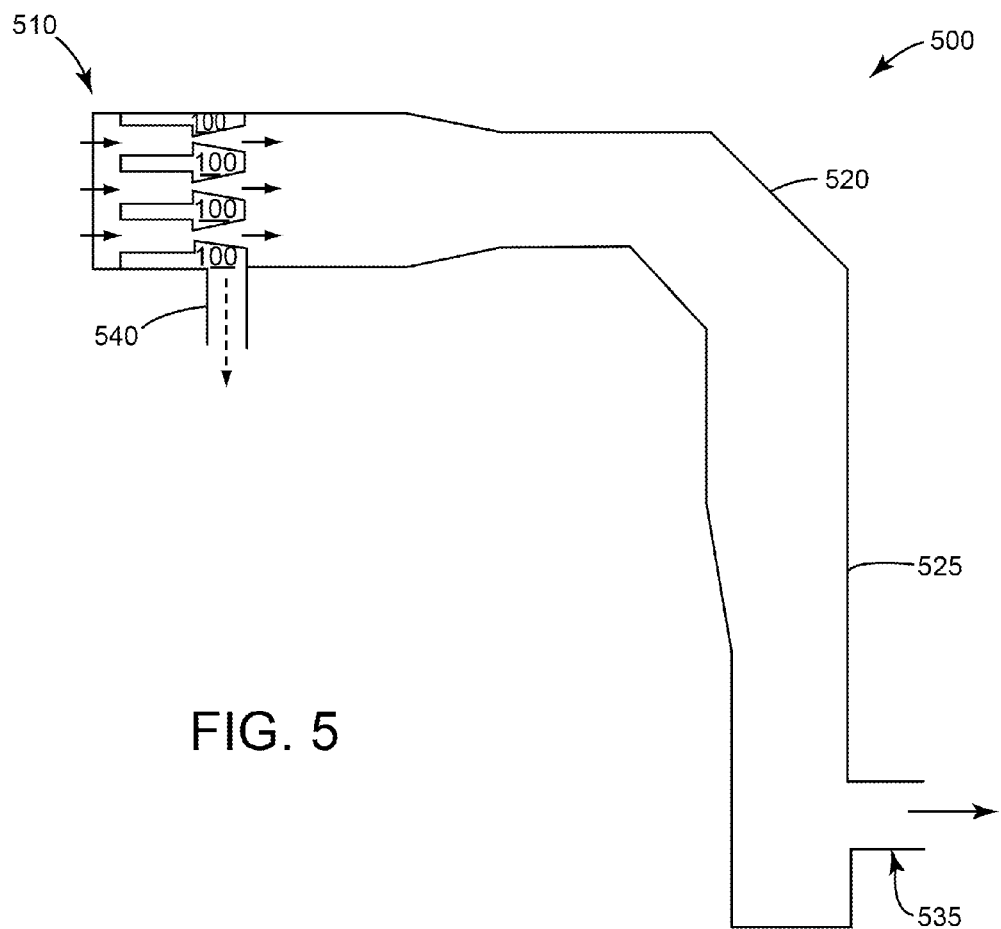
FIG. 5 is a schematic illustrating a side view of an inlet system integrated with a bank of inertial filters, in accordance with an embodiment of the present invention.

FIG. 5 is a schematic illustrating a side view of an inlet system 500 integrated with a bank of inertial filters 100, in accordance with an embodiment of the present invention. In this embodiment, a bank of inertial filters 100 may be installed adjacent or downstream the weather hood 510. Here, the inertial filters 100 may be arranged in a robust structure. As the compressor section 535 draws in the airstream, the inertial filters 100 may separate the dust and other particles from the airstream. These undesired particles may flow through the outlet 135, as described, and exit via the discharge 540. The remaining filtered airstream flows through expander 140, as described, and then downstream through the other components of the inlet system 500 to enter the compressor section 535.

Figure 6:
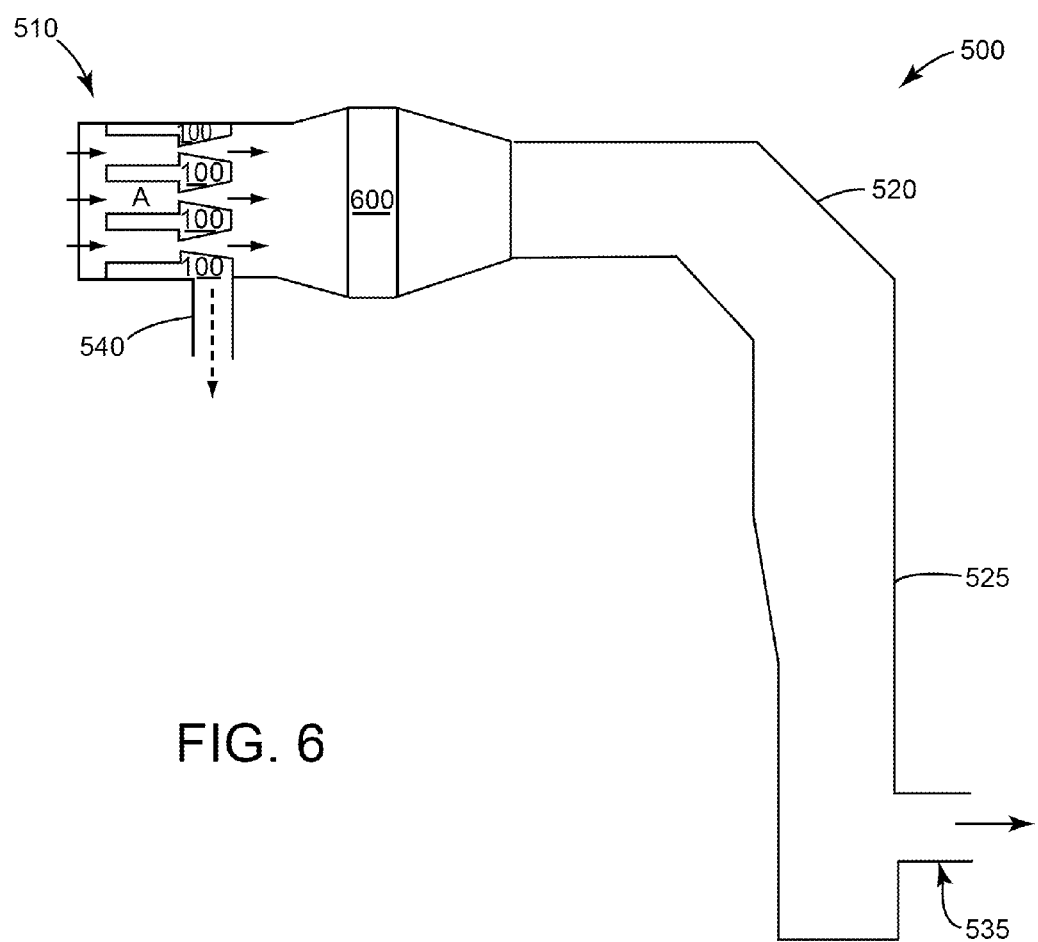
FIG. 6 is a schematic illustrating a side view of an inlet system integrated with a bank of inertial filters, in accordance with a first alternate embodiment of the present invention.

FIG. 6 is a schematic illustrating a side view of an inlet system 500 integrated with a bank of inertial filters 100, in accordance with a first alternate embodiment of the present invention. To avoid redundancy, only the main differences between the embodiments illustrated in FIGS. 5 and 6 are discussed herein. FIG. 6 illustrates an embodiment having an inlet system 500 comprising both the inertial filters 100 and media filters 600. Here, the inertial filters 100 may be used to remove larger or denser particles from the airstream. The media filters 600 may be installed downstream of the inertial filters 100, and may serve to remove smaller or less dense particles from the airstream. After flowing through the array of inertial filters 100, the airstream may flow through the media filters 600 and eventually to the compressor section 535, as described.

Figure 7:
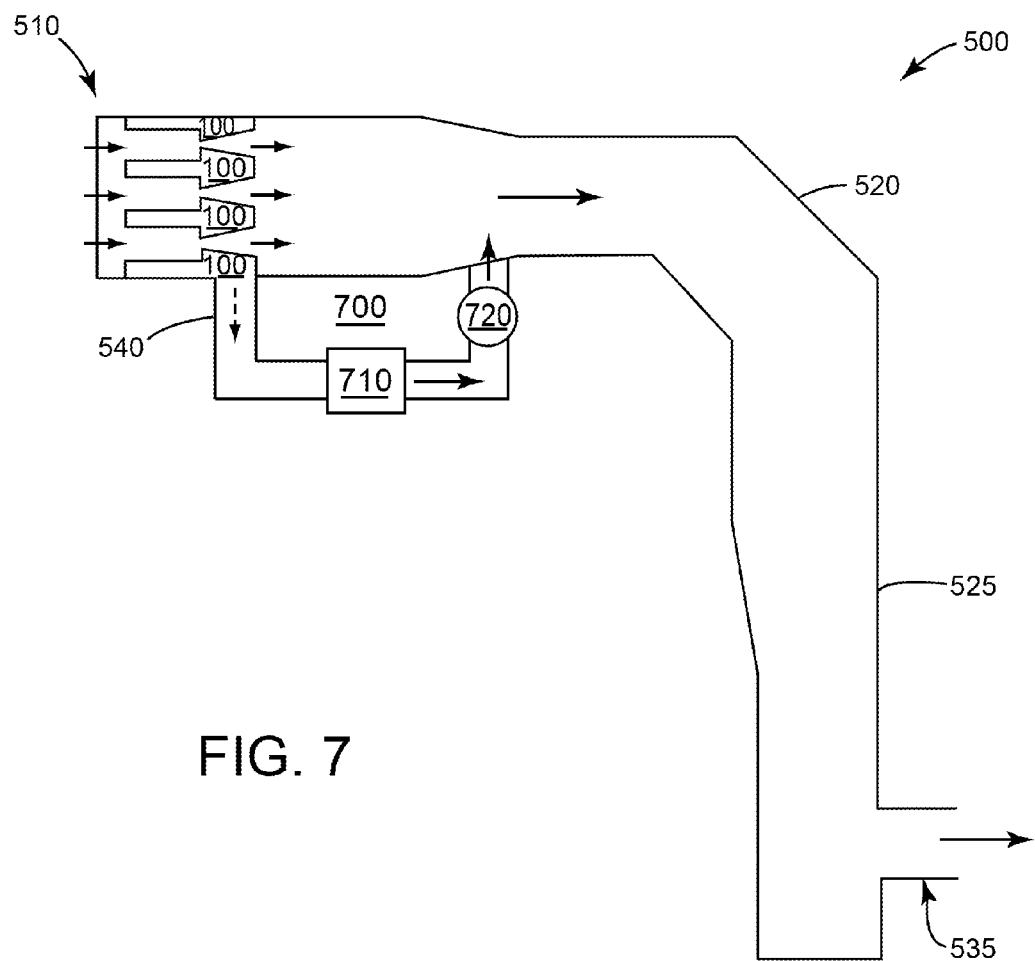
FIG. 7 is a schematic illustrating a side view of an inlet system integrated with a bank of inertial filters, in accordance with a second alternate embodiment of the present invention.

FIG. 7 is a schematic illustrating a side view of an inlet system 500 integrated with a bank of inertial filters 100, in accordance with a second alternate embodiment of the present invention. Here, a flow circuit 700 is integrated with the discharge 540. The flow circuit 700 serves to filter and reintroduce the discharged airstream originating at the outlet 135. The flow circuit 700 may comprise a media filter 710 for filtering the received portion of the airstream; and an air-circulating device 720 for circulating that airstream through the flow circuit 700. The air-circulating device 720 may comprise the form of a fan, blower, or the like. After flowing through the flow circuit 700, the airstream may be reintroduced to the inlet system 500 via the transition piece 520.

Figure 8:
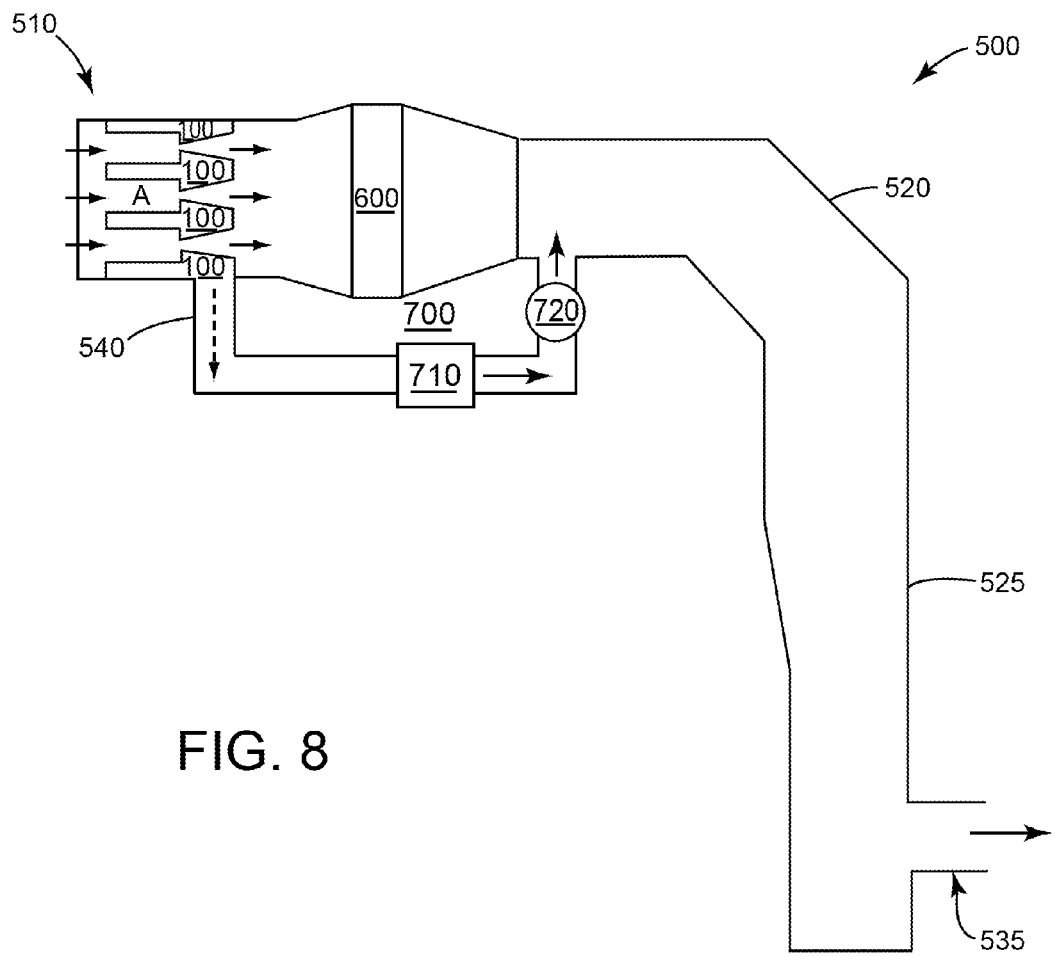
FIG. 8 is a schematic illustrating a side view of an inlet system integrated with a bank of inertial filters, in accordance with a third alternate embodiment of the present invention.

FIG. 8 is a schematic illustrating a side view of an inlet system integrated with a bank of inertial filters, in accordance with a third alternate embodiment of the present invention. This third embodiment represents a combination of the first and second embodiments, as illustrated in FIGS. 6 and 7; and may incorporate the previous described features and advantages.

The flow circuit 700 associated with the embodiments illustrated in FIGS. 7 and 8 may allow for optimizing the desired filtration efficiency by allowing a user to control the speed of the air-circulating device 720. This feature may serve as a means to adjust the pressure drop of the inlet system 500.

There are many features and advantages provided by embodiments of the present invention. Some inlet systems have a requirement of 99.9% filtration efficiency for approximately 8 micron and above particles at a pressure drop of approximately 1.5 inches of water column. Embodiments of the proposed invention may provide approximately 99.9% of filtration efficiency for approximately 2 micron and above particles at a pressure drop of approximately 1.2 inches of water column. Furthermore, some inlet systems are designed for a face velocity of 600 feet per minute, which requires a relatively large cross-sectional area. Embodiments of the present invention may allow inlet systems to experience a higher face velocity, which may allow a reduction in the cross-sectional area.

Although the present invention has been shown and described in considerable detail with respect to only a few exemplary embodiments thereof, it should be understood by those skilled in the art that we do not intend to limit the invention to the embodiments since various modifications, omissions and additions may be made to the disclosed embodiments without materially departing from the novel teachings and advantages of the invention, particularly in light of the foregoing teachings. Accordingly, we intend to cover all such modifications, omission, additions and equivalents as may be included within the spirit and scope of the invention as defined by the following claims.

What is claimed is:

1. An apparatus for filtering an airstream entering a machine, the apparatus comprising an inertial filter comprising:
   a tube configured for directing the airstream into the machine, wherein the tube comprises an inlet located adjacent an upstream end and an outlet located adjacent a downstream end;
   a swirler configured for generating a vortex on the airstream entering the tube, wherein the swirler is positioned within the tube and downstream of the inlet;
   a separation region located downstream of the swirler, wherein the separation region allows components of the airstream to concentrate toward an outer periphery region of the tube, and wherein action of the swirler creates swirl in the airstream which separates particles from the airstream;
   a central region located downstream of the swirler and near a center portion of the tube, wherein the central region is in fluid communication with the separation region and receives less dense components of the airstream, as the separation region receives the more dense components of the airstream;
   a reducer configured for increasing angular momentum associated with the airstream, wherein the reducer is integrated with the tube;
   and an expander configured for recovering a pressure loss, wherein an upstream end of the expander is concentrically integrated with a downstream end of the reducer, such that the outlet is located in an annular region formed between an outer diameter of the upstream end of the expander and an inner diameter of the downstream end of the reducer;
   wherein as the airstream flows through the tube, the particles from the airstream separate from the airstream and then flow through the separation region and exit the tube via the outlet.

2. The apparatus of claim 1, wherein the swirler comprises a plurality of blades.

3. The apparatus of claim 2, wherein the swirler comprises four twisted blades.

4. The apparatus of claim 3, wherein an angle between each of the four twisted blades comprises a range from about 75 degrees to about 360 degrees.

5. The apparatus of claim 3, wherein a length of each of the four twisted blades comprises a range of from about 0.5 inch to about 3 inches.

6. The apparatus of claim 1, wherein the swirler is integrated with a rod configured for reducing a pressure drop.

7. The apparatus of claim 1, wherein a length of the tube comprises a range of from about 1 inch to about 18 inches, and a diameter of the tube comprises a range of from about 0.5 inch to about 2 inches.

8. The apparatus of claim 1, wherein the reducer comprises a taper, wherein a major diameter of the taper faces upstream and a minor diameter of the taper faces downstream.

9. The apparatus of claim 1 further comprising a plurality of inertial filters arranged in a bank, wherein the bank is located within an inlet system of the machine.

10. A system for removing particles from an airstream entering a turbomachine, the system comprising:
   an inlet system configured for channeling the airstream to a compressor section, the inlet system comprising:
   a weather hood;
   a transition piece;
   and an inlet duct;
   and a plurality of inertial filters configured for separating the particles from the airstream, wherein each of the plurality of inertial filters comprise:
   a tube configured for directing the airstream into the turbomachine, wherein the tube comprises an inlet located adjacent an upstream end, and an outlet located adjacent a downstream end;
   a swirler configured for generating a vortex on the airstream entering the tube, wherein the swirler is positioned within the tube and downstream of the inlet;
   a reducer configured for increasing angular momentum associated with the airstream, wherein the reducer is integrated with the tube and is positioned downstream of the swirler adjacent the outlet;
   and an expander configured for recovering a pressure loss associated the reducer, wherein an upstream end of the expander is concentrically integrated with a downstream end of the reducer, such that the outlet is located in an annular region formed between an outer diameter of the upstream end of the expander and an inner diameter of the downstream end of the reducer;
   wherein as the airstream flows through the swirler and a central portion of the tube, denser particles from the airstream separate from the airstream, and then exit via the outlet.

11. The system of claim 10 further comprising a separation region located downstream of the swirler, and wherein the separation region allows the particles from the airstream to concentrate toward an outer periphery region of the tube and wherein the particles from the airstream are separated out of the airstream by the swirler.

12. The system of claim 11 further comprising a central region located downstream of the swirler and near a center portion of the tube, and wherein the central region is in fluid communication with the separation region, and the central region receives the airstream as the separation region receives the particles from the airstream.

13. The system of claim 10, wherein the plurality of inertial filters is positioned in an array within a structure mounted within the weather hood.

14. The system of claim 13 further comprising a discharge configured for receiving the particles from the airstream exiting the outlet, wherein the discharge is integrated with the structure.

15. The system of claim 14 further comprising an inlet filter house configured for removing the particles from the airstream, wherein the inlet filter house comprises a plurality of the media filters.

16. The system of claim 15, wherein the inlet filter house is positioned downstream of the plurality of inertial filters.

17. The system of claim 14 further comprising a flow circuit configured for recirculating the airstream exiting the discharge, wherein an upstream end of the flow circuit is integrated with the discharge, and a downstream end of the flow circuit is integrated with the transition piece.

18. The system of claim 17, wherein the flow circuit comprises a media filter for removing particles from the airstream.

19. The system of claim 18, wherein the flow circuit comprises an air-circulating device adapted for moving the airstream through the flow circuit.

20. The system of claim 19 further comprising a media filter configured for removing particles from the airstream.

* * * * *